(12) United States Patent
Gillaspie (10) Patent No.: US 9,734,047 B2
(45) Date of Patent: Aug. 15, 2017

(54) METHOD AND APPARATUS FOR AN IMPROVED AUTOMATED TEST OF SOFTWARE WITH A GRAPHICAL USER INTERFACE

(71) Applicant: TestPlant Europe Ltd, London (GB)

(72) Inventor: Jonathan Gillaspie, Boulder, CO (US)

(73) Assignee: TESTPLANT EUROPE LTD, London (GB)

( * ) Notice: Subject to any disclaimer, the term of this patent is extended or adjusted under 35 U.S.C. 154(b) by 140 days.

(21) Appl. No.: 14/811,514

(22) Filed: Jul. 28, 2015

(65) Prior Publication Data
US 2017/0031808 A1    Feb. 2, 2017

(51) Int. Cl.
G06F 11/00    (2006.01)
G06F 11/36    (2006.01)

(52) U.S. Cl.
CPC ...... *G06F 11/3692* (2013.01); *G06F 11/3684* (2013.01); *G06F 11/3688* (2013.01)

(58) Field of Classification Search
USPC .................................................. 714/25, 47.1
See application file for complete search history.

(56) References Cited

U.S. PATENT DOCUMENTS

| 5,511,185 A | 4/1996 | Weinbaum et al. | |
| 2005/0166094 A1* | 7/2005 | Blackwell | G06F 11/3664 714/38.14 |
| 2006/0085681 A1* | 4/2006 | Feldstein | G06F 11/3684 714/25 |
| 2014/0129878 A1* | 5/2014 | Saltzman | H04L 67/2804 714/38.1 |

FOREIGN PATENT DOCUMENTS

| GB | 2515386 A | 12/2014 |
| WO | 2007055610 A1 | 5/2007 |

OTHER PUBLICATIONS

UKIPO Combined Search and Examination Report dated Sep. 29, 2015 for corresponding application No. GB1515408.1.

* cited by examiner

*Primary Examiner* — Sarai Butler
(74) *Attorney, Agent, or Firm* — Conley Rose, P.C.

(57) ABSTRACT

A method for performing an automated computer test. The automated test is configured to cause a test computer system to control a GUI of a system under test including one or more computer programs being executed upon a computer device. The automated computer test includes one or more verification steps configured to test whether one or more operations have been successfully completed by the system under test. The verification step(s) include monitoring at least a part of the GUI of the system under test to detect a change in the GUI within a predetermined time period, and determining that one or more operations have been completed successfully if a change in the GUI is detected within the predetermined time period. Thus, a verification test can be performed on a GUI even if the appearance of the GUI after the successful completion of the test is not known in advance.

27 Claims, 7 Drawing Sheets

METHOD AND APPARATUS FOR AN IMPROVED AUTOMATED TEST OF SOFTWARE WITH A GRAPHICAL USER INTERFACE

CROSS-REFERENCE TO RELATED APPLICATIONS

None.

BACKGROUND

Modern software products can be increasingly complex, as can the devices that run these products. The number of different computing devices available on the market is constantly increasing, with consumers requiring smartphones, tablets, smart watches, portable computers as well as the traditional personal computer (PC). To justify the cost of development, and to meet consumer needs, it is often required to roll out a software application across a range of different devices and operating systems. A program developer often has to take into account different operating systems, communication protocols and system hardware when developing new software. As a result, it is often difficult to ensure that a software product is functional across a complete range of devices and operating systems, and that any errors, flaws, failures, or faults (otherwise known as 'bugs') in the software product are identified. Typically, these 'bugs' are only discovered when the software is run. The testing of a software product, pre-launch, is therefore important to a software developer.

SUMMARY

According to a first aspect of the present disclosure there is provided a method for performing an automated computer test, the automated test being configured, when executed, to cause a test computer system to control a graphical user interface of a system under test comprising one or more computer programs being executed upon a computer device, wherein the automated computer test comprises one or more verification steps configured to test whether one or more operations have been successfully completed by the system under test, the or each verification step comprising: a) monitoring at least a part of the graphical user interface of the system under test to detect a change in the graphical user interface within a predetermined time period; and b) determining that one or more operations have been completed successfully if a change in the graphical user interface is detected within the predetermined time period, wherein the method further comprises the step of: c) performing further operations and/or verification steps on the system under test if required.

In one embodiment, step a) further comprises: d) defining one or more sections of the graphical user interface; and e) monitoring only the or each predefined section for changes.

In one embodiment, the or each predefined section is selected to correspond to a window, icon or other known element on the graphical user interface.

In one embodiment, the or each predefined section is rectangular.

In one embodiment, the location and/or size of the or each predefined section is defined relative to a known graphical user interface element.

In one embodiment, the or each predefined section has an area which is 50% or less of the total area of the graphical user interface of the system under test. In one embodiment, the or each predefined section has an area which is 25% or less of the total area of the graphical user interface of the system under test.

In one embodiment, the or each predefined section has an area which is 10% or less of the total area of the graphical user interface of the system under test.

In one embodiment, the or each predefined section has an area which is 10% or less of the total are of the graphical user interface of the system under test. In one embodiment, the or each predefined section has an area which is 5% or less of the total area of the graphical user interface of the system under test.

In one embodiment, the or each predefined section has an area which is 1% or less of the total area of the graphical user interface of the system under test.

In one embodiment, the predetermined time period is five minutes or less. In one embodiment, the predetermined time period is one minute or less. In one embodiment, the predetermined time period is 30 seconds or less. In one embodiment, the predetermined time period is 2 seconds or less. In one embodiment, the predetermined time period is 1 second or less.

In one embodiment, a change in the graphical user interface comprises a change in the graphical and/or software configuration of the GUI.

In one embodiment, said one or more operations may comprise one or more operations performed on the system under test or on a further system under test in communication with the system under test.

In one embodiment, if a change in the graphical user interface is not detected within the predetermined time period, the method comprises the steps of: f) determining that the verification step has failed.

In one embodiment, the method further comprises: g) providing an indication to the user of the test failure.

In one embodiment, prior to step a), the automated test further comprises the step of: h) executing an operation on the graphical user interface of the system under test, wherein the change detected in step b) is a change resulting from the execution of the operation.

In one embodiment, the predetermined time period is determined from the time the operation was executed on the graphical user interface.

In one embodiment, said one or more operations comprise one or more of the following commands: a selection of an object, image, icon, button and/or other user interface item on the graphical user interface; the selection of a dialog box; the selection of a menu item; the opening of window; the selection of an executable object; a request or instruction to start a program or application; a text-based instruction; and/or an instruction to a further system under test to communicate with the system under test.

In one embodiment, the automated computer test comprises a test description configured to be executed by a test program to cause the test computer system to perform the automated computer test.

In one embodiment, the test description comprises the one or more verification steps. In one embodiment, the test description comprises one or more steps configured to execute the one or more operations.

According to a second aspect of the present disclosure, there is provided a method for performing an automated computer test, the automated test being configured, when executed, to cause a test computer system to control a graphical user interface of a system under test comprising one or more computer programs being executed upon a computer device, wherein the method comprises the steps of: a) executing an operation on the graphical user interface of the system under test; b) monitoring at least a part of the graphical user interface to detect a change in the graphical user interface resulting from the operation on the graphical user interface, wherein, if a change is detected, the method further comprises the steps of: c) receiving an image of the graphical user interface of the remote system under test; and d) comparing the received image from the system under test with one or more existing reference images to identify an expected image.

By providing such a method, the test program is operable to detect the correct execution of an operation on the GUI by identification of a change in a predetermined section or region of the GUI. Advantageously, this process offers the possibility of enabling accurate detection of an action or operation without explicit knowledge of the GUI output resulting from this action.

In one embodiment, in step b), a change in the graphical user interface comprises a change in the graphical and/or software configuration of the GUI.

In one embodiment, the operation on the graphical user interface of the system under test comprises one or more of: a selection of an object, image, icon, button and/or other user interface item on the graphical user interface; the selection of a dialog box; the selection of a menu item; the opening of a window; the selection of an executable object; a request or instruction to start a program or application; a text-based instruction; and/or an instruction to a further system under test to communicate with the system under test.

In one embodiment, in step b), if a change is detected, the method further comprises, prior to step c): e) waiting for a predetermined time period.

In one embodiment, if, in step d), an expected image is identified, the method further comprises: f) signifying a test pass.

In one embodiment, in step d), an expected image is not identified the method further comprises the step of: g) signifying a test failure.

In one embodiment, in step b) a change is not detected within a predetermined time period, the method further comprises the step of: h) signifying a test failure.

In one embodiment, the automated computer test comprises a test description configured to be executed by a test program to cause the test computer system to perform the automated computer test.

In one embodiment, the test description comprises an executable instruction to carry out step a).

According to a third aspect of the present disclosure, there is provided a computer readable medium comprising instructions configured when executed to perform the method of the first or second aspects.

According to a fourth aspect of the present disclosure, there is provided a computer system comprising: a processing device, a storage device and a computer readable medium of the third aspect.

BRIEF DESCRIPTION OF THE DRAWINGS

Embodiments of the present disclosure will now be described in detail with reference to the accompanying drawings, in which.

DETAILED DESCRIPTION OF DISCLOSED EMBODIMENTS

There is presented herein a method for performing an automated test with improved accuracy and reliability. The methods presented herein may be performed upon the executing of instructions stored upon one or more computer readable media. A system is also provided that is configured to perform the method/s as described herein. Typically the reference data comprises a reference image, but in principle may be any reference data.

Software test engineers commonly test the functionality and behavior of a program both pre and post launch. When performing testing, it is desirable to test out the software on a large number of devices and operating systems to ensure the product is ready for widespread sale for (and can be supported by) all types of computer system. A program which works well on one type of device may experience difficulties running on another type of device. The testing can therefore be a time consuming exercise. Accordingly, the test engineer may want to test multiple devices without having to physically interface with each System Under Test (SUT). Typically the same test will need to be executed a number of different times on the same operating system. Furthermore, when having to perform the same test on a number of different devices, the test engineer would ideally want to run the same sequence of steps without actually having to input each and every step for every test.

One of the most important times to test software is when new versions of the software are released. When such new versions are released, a development team typically creates a "candidate" version of the software. The software testers then test it to find bugs and send the candidate version back to the development team for improvement. The development team then creates a new "candidate." The testers then re-test it to find further bugs and again send it back to development. This loop continues until the software works correctly and it is delivered to customers.

At some further point in time, the development team will typically add some new features to the existing program. The testers then not only have to test the new features, but also that the old features have not 'broken' (i.e. ceased to operate as desired) with the introduction of and/or interaction with the changes. This is called "regression testing." Therefore over the life of a software product, a single test case will be executed 10s, 100s, possibly 1000s of times.

Test programs are known to test the functionality of a SUT. Typically the test program is run upon a computing device or computing system that is remote from the SUT. The computer system running the test program is however in communication with the SUT so that the test program can interact with the SUT. The SUT may be, for example, a PC running a version of Microsoft Word® upon a Windows 7® operating system.

Test programs typically test a SUT by interacting with the SUT and validating the state of the SUT according to an input test description. Test descriptions may also be referred to as automated test descriptions. Test descriptions can take many forms including but not limited to text instructions, software in source code or binary form, work-flows in a diagrammatical form (such as a flow chart). Typically, test descriptions contain lines of text or other characters that when executed by the test program cause the SUT to perform particular actions or execute functions. Therefore executing (or 'running') the test description through the test program allows the system under test to be tested automatically, without requiring a test engineer to provide input to the testing process, other than initiating it.

Some test programs that use automated test descriptions are known in the art. One test program that helps software engineers automate the testing process is 'eggPlant®' by TestPlant®. The eggPlant® software tool allows a user to create and subsequently execute an automated test description to test a large number of SUTs. This test program interacts and controls a SUT by receiving and analyzing images of the SUT Graphical User Interface (GUI).

Test programs such as eggPlant® that utilize GUI images operate by identifying expected objects in a GUI image that relate to executable functions that the test description may wish to identify and interact with or indicate the status of the SUT. Once the expected image has been identified in the GUI image, the test program description can move to the next step in the test. The identification of the expected image is performed using image analysis. The image analysis searches the GUI image for the expected image using an existing reference image that is similar or identical to an expected image. When a match is found, the expected image is identified. Examples of image may include: an image of a button on the GUI that when 'clicked' would open a dialogue box, or the presence of a particular graphical object that signified the completion of a particular action performed by the target program. The test program may use image analysis techniques to perform these comparisons.

However, an issue can arise when detecting certain aspects of a GUI in an automated test. For example, whilst the detection of an expected image may be appropriate and accurate in many cases, in certain cases it is not possible to use this process to confirm that a particular operation has been completed successfully. For example, if there is no a priori knowledge of the form the expected image will take until it is generated, then it is not possible to search for such an expected image because the test computer system does not know what image to match.

Therefore, a technical problem can arise when the outcome of a test process is dependent upon the detection of a new or previously unknown image on the GUI of a SUT, or where a priori knowledge of the image to be detected is not available. The present disclosure, in aspects, addresses this problem.

The present disclosure relates to a method of, and apparatus for, performing an automated computer test. More particularly, the present disclosure relates to a method of, and apparatus for performing an automated computer test with improved accuracy and reliability.

The automated test is configured when executed, to cause a test computer system 6 to communicate with a SUT 2. This is achieved through transfer of data, either directly or indirectly, between the SUT 2 and the test computer system 6. Data may be communicated in any suitable manner, i.e. data may be sent directly or indirectly from the test computer system 6 to the SUT 2 and/or data may be sent directly or indirectly from the SUT 2 to the test computer system 6.

Figure 1:
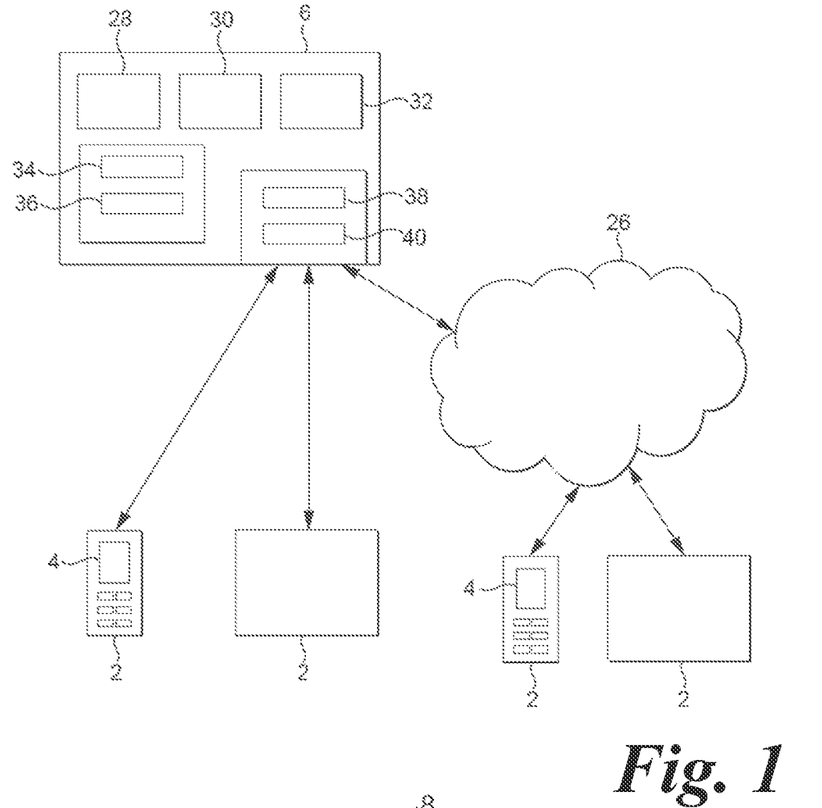
FIG. 1 shows an example of a test computer system that is in communication with several systems under test.

By communicating with the SUT 2, the test computer system is operable to interact with the SUT, for example by receiving GUI 4 images and/or sending commands to control the SUT. The automated test description is typically configured, when executed by a test program, to test the functionality and/or behaviour of a SUT. A test computer 6 communicable with several SUTs 2 is shown in FIG. 1.

The term "test description" may also be termed throughout the application as an "automated test description." Typically, a "test description" 24 forms part of an "automated test." The test description 24 is typically lines 62 of text or other characters that typically contain instructions, that when executed by the test program, cause the SUT 2 to perform particular actions or execute functions. An instruction in the description 24 can include one or more standard commands and/or one or more other pieces of information or data. For example, the command "Typetext" may be followed by the words "This is a test." The test program running the automated test would execute the standard command "Typetext" to cause the SUT 2 to type the words "This is a test" into a particular text entry box on the SUT GUI 4.

The automated test may have further metadata associated with the description. Such metadata may be, an image associated with a particular instruction in the description. The test may be stored using one or more storage device or computer readable media as described herein. For the purposes of this application, when reference is made to the test program running the test description, this is taken to mean the running of the automated test.

The SUT 2 comprises one or more computer programs which are executed upon a computer device. The SUT 2 may be remote from the test computer system 6. The term 'remote' is intended to mean that the computer system or device is physically separate to the test computer system 6 such that when the test computer system and remote computer system interact, one or more transmitter and receiver devices are used to send and receive data over one or more communication channels. The communication channel may be any suitable channel using any of electrical, electromagnetic or optical signals.

Figure 2:
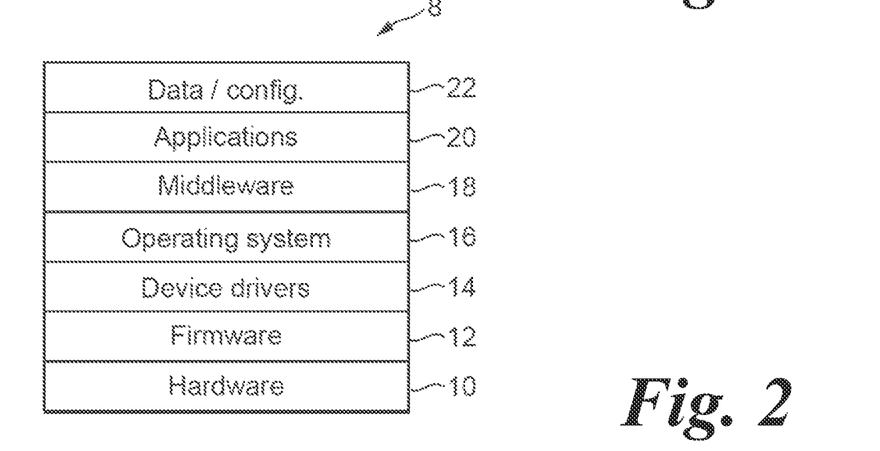
FIG. 2 shows an example of a hardware/software stack model representation for a system under test.

The SUT 2 can be any computing system or device running one or more computer programs. FIG. 2 shows an example model of a hardware/software stack 8 for a SUT 2. The test computer system 6 can control features or aspects of any of these layers by interacting with the SUT 2. The SUT 2 in principle can include any one or more parts of the hardware/software stack 8 of the system being tested 2, i.e. the hardware 10, firmware 12, device drivers 14, operating system 16, middleware 18, applications 20 and data/config 22. Typically a SUT 2 will at least comprise hardware 10 and an operating system 16. FIG. 2 is only an example of a hardware/software stack model 8. Other models with further details and layers may also be used to define a SUT 2. The term 'computer program' is taken to mean any of (but not necessarily limited to) an application program 20, middleware 18, an operating system 16, firmware 12 or device drivers 14 or any other medium supporting executable program code.

The term 'hardware' 10 is taken to mean any one or more of the collection of physical elements that constitutes a computer system/device such as, but not limited to, a processor, memory device, communication ports, input/ output devices. The term 'firmware' 12 is taken to mean any persistent memory and the program code/data stored within it, such as but not limited to, an embedded system. The term 'device drivers' 14 is taken to mean the one or more programs that operate to control a particular type of device incorporated into or attached to the computer device/system. The term 'operating system' 16 is taken to mean the one or more pieces, often a collection, of software that manages computer hardware and provides common services for computer programs. The term 'middleware' 18 is taken to mean the computer software that provides services to software applications beyond those available from the operating system 16. The term "applications" 20 is taken to mean the computer software that causes a computing device or system to perform tasks that are typically beyond the running of the computer itself. The term 'data/config.' 22 is taken to be any other information provided to the SUT 2 that can be used to affect its running or output, for example data input into the application program 20.

A SUT 2 may comprise a different physical device to another SUT 2 as shown in FIG. 1. For example, the SUTs may be different physical computing devices running the same application program 20 using the same or different application program 20.

Alternatively, a SUT 2 may differ from another SUT 2 simply by running a different operating system 16 and/or different version of one or more application programs 20. For example, a first SUT 2 may be a PC (i.e. the computer hardware) running an operating system 16 and a first version of an application program 20, whereas a second SUT 2 may be the same hardware 10 as the first SUT 2, running the same type and version of the operating system 16 but running a second, updated version of the application program 20. In principle, one SUT 2 may differ from another SUT 2 by virtue of any different hardware/software configuration. For example any change in any one or more of the layers in the stack 8 of FIG. 2 from hardware 10 to application program 20, may give rise to a different SUT 2.

Typically when the test computer device interacts with the SUT 2, it does so using a test program that executes the test description 24. Typically the test program is hosted on the test computer system 6. The description 24, when run (executed) by the test program, typically causes the SUT 2 to be controlled by the test computer system 6. For example, a line in the test description 24 run by the test program with the phrase "click button X" will cause button 'X' on the GUI 4 of the SUT 2 to be selected and the operation associated with the selection of that button to be started upon the SUT 2.

FIG. 1 shows an example of a test computer system 6 in communication with a number of SUTs 2. Two SUTs 2 are in direct communication with the test computer system 6, for example using infrared or Bluetooth communications, or over a local wired or wireless network, whilst two other SUTs are in communication with the test computer system 6 via the internet 26.

The test computer device/system 6 may be any suitable computer device, system, collection of computing devices or collections of computing systems. The test computer system 6 may, in non-limiting examples, comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel® processor, an AMD® processor.

The controller 30 may be any suitable controller including any one or more of a controller chip, a controller board, a mainframe controller, an external controller or any other suitable controller. The controller may be, for example, a micro-controller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

Figure 3:
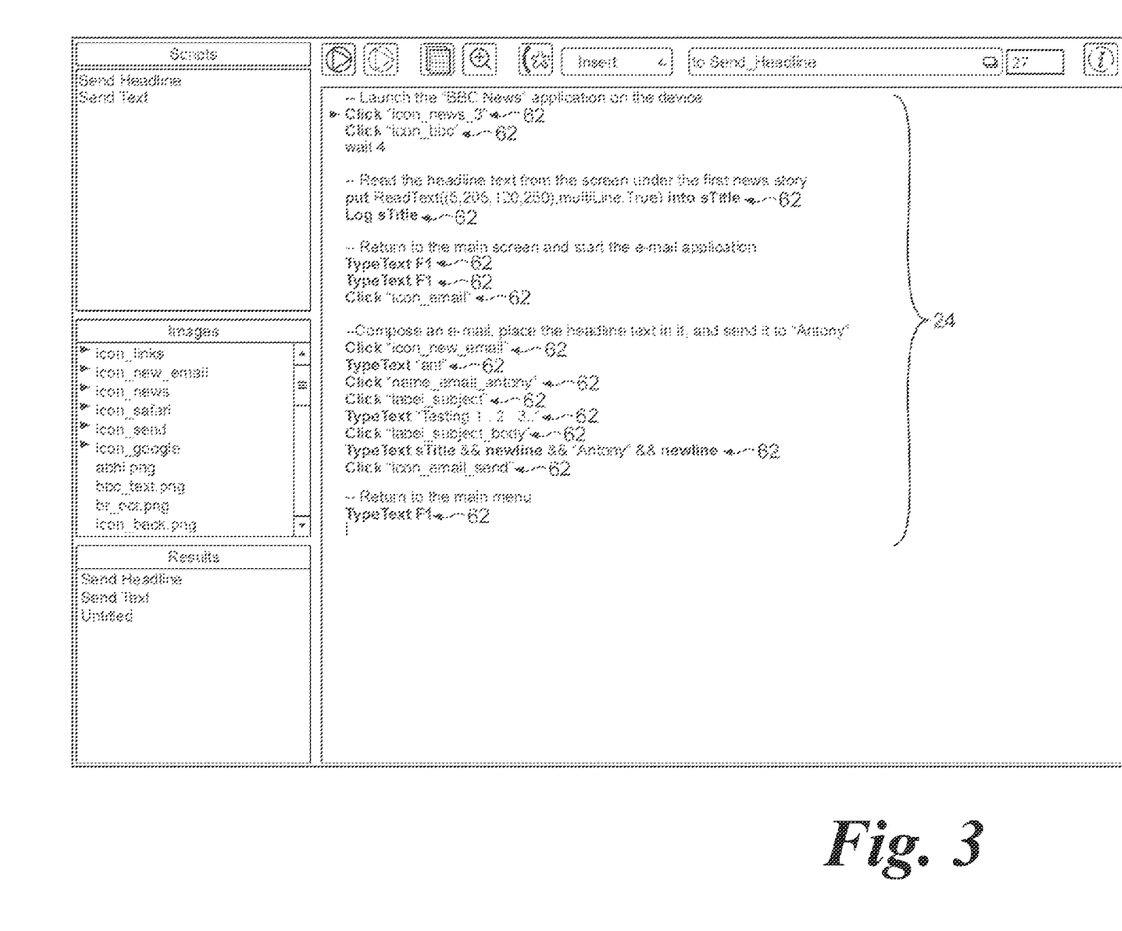
FIG. 3 shows an example of a test description.

The automated test is carried out by running a test description within a test program. FIG. 3 shows an example of a test description 24 run within a test program. The test description 24 comprises multiple lines of text, numbers or other symbols that are typically executed by the test program in a sequential manner.

The description 24 may be written in any suitable scripting language, for example SenseTalk®. Preferably the description is loadable onto a carrier device such as a disc, memory stick or any other suitable electronic data carrier.

Figure 4:
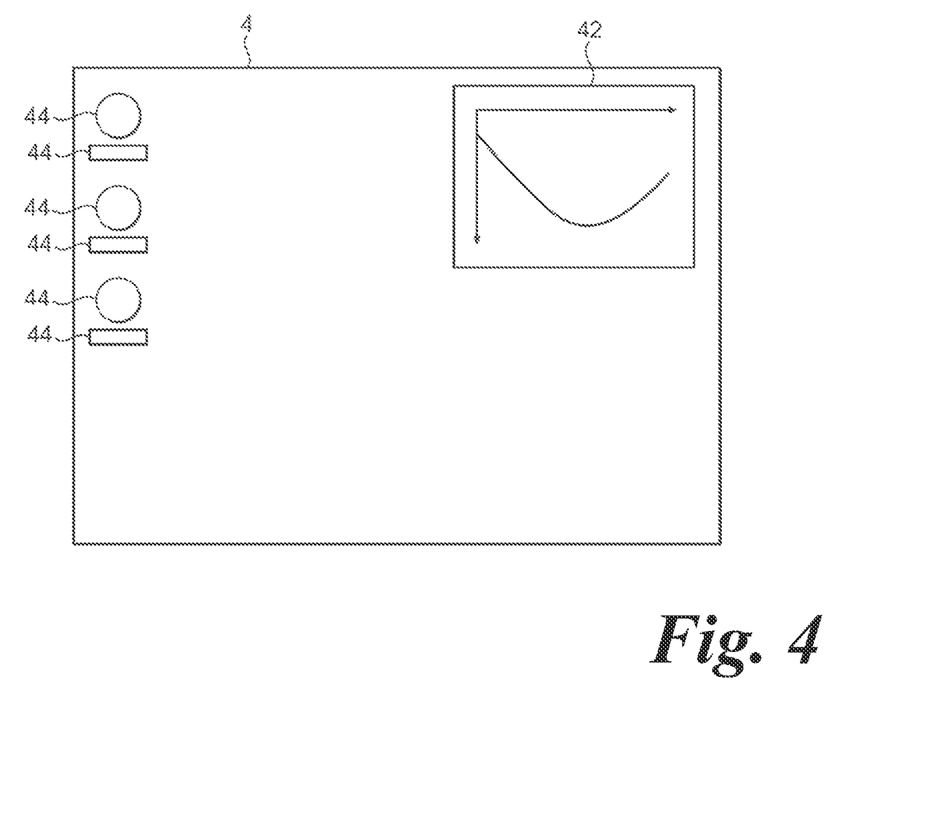
FIG. 4 shows an example of a GUI for a system under test.

The test program may utilise one or more GUI 4 images received directly or indirectly from the SUT 2. FIG. 4 shows an example of a typical GUI 4. Typically the GUI 4 images are "snapshots" of the output of the GUI 4 of the SUT 2 at a particular time. Typically these snapshots are saved as a graphical image file, for example a bitmap, gif or jpeg file. The GUI 4 images may be a snapshot of the whole GUI 4 or one or more portions of the GUI 4. GUI snapshots may be only portions of the GUI image that have changed since a previous GUI image was sent.

In non-limiting examples, a test program is used to execute the test description 24. However, the functionality required to execute the test description 24 may be hosted by an operating system or any other software or dedicated hardware, for example the test description 24 may be a standalone executable file itself.

Figure 5:
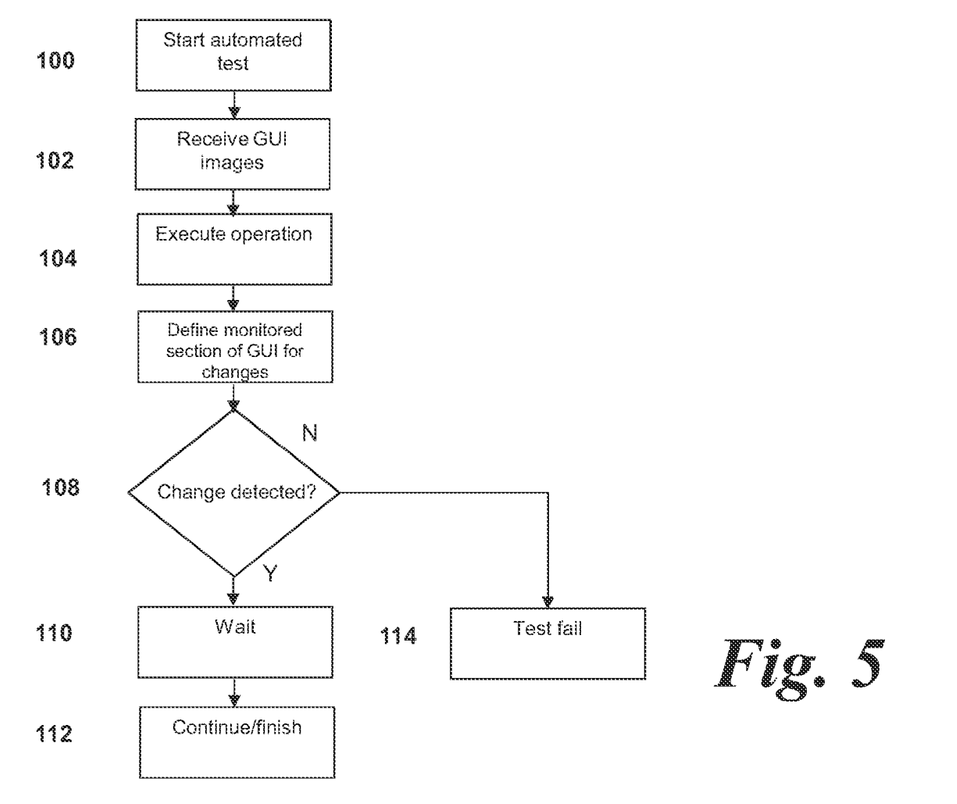
FIG. 5 shows a flow chart in accordance with an embodiment of the present disclosure.

A method according to an embodiment of the disclosure will now be described with reference to FIG. 5. FIG. 5 shows a flow chart of a simple exemplary embodiment of a method according to the present disclosure. It is to be understood that the following method is exemplary of the steps that may be carried out in accordance with an embodiment of the disclosure. However, the skilled person would readily understand that additional steps or variations could be implemented within the scope of the present application.

Step 100: Start Automated Test

At step 100, the automated test is started. The test description 24 is run within a test program and comprises multiple lines of instructions which are to be executed by the test program to carry out the necessary steps of the test. The method proceeds to step 102.

Step 102: Receive GUI Images

At step 102, GUI images are received by the test computer system 6. It is to be understood that this step may take place continuously during the steps of the method. For example, GUI images may be sent continuously by the SUT 2 at a particular update frequency, for example the SUT 2 may send a new GUI image to the test computer every 0.3 seconds. It may not be necessary to send the entirety of the GUI image or images in an update. For example, in an embodiment, only the pixels of the GUI image which have changed since the last update may be sent.

Alternatively, it may take place as and when required by the test description 24 and/or the test computer system 6. For example, the SUT 2 may send GUI images to the test computer system 6 automatically upon an initial command to start sending the images. Additionally or alternatively the SUT 2 may send one or more GUI images upon a command sent from the test computer system 6. Additionally or alternatively the SUT 2 may send one or more GUI images upon a command sent to the SUT 2 resulting from an instruction from the test program, and/or the test description 24.

The GUI images received from the SUT 2 may be stored by one or more memory elements 32. The memory elements 32 may be housed within and/or are part of the test computer system 6. Additionally or alternatively one or more memory elements may be housed remotely from, but in communication with, the test computer system 6.

An example of the type of images a test computer 6 may receive from an SUT 2 will now be described. In this example, the SUT 2 only sends images corresponding to the areas of the GUI 4 output that have changed since the last GUI images were sent to the test computer 6. However, it is to be understood that other mechanisms, for example the sending of a full image for each update, may be carried out.

In this example the SUT 2 sends new GUI images to the test computer 6 at a rate of one new image every 0.3 seconds. However, this is to be taken as non-limiting and the GUI update could occur at any frequency or could be at an intermittent update rate (i.e. not a constant frequency).

FIG. 4 shows an example of the output from the GUI 4 of an SUT 2 at a time $t_0$. This GUI 4 output has a graph 42 near the top right hand corner showing a curve and a negative Y axis, and six image objects 44 along the left hand edge of the GUI 4. The GUI 4 output is the first output that the test computer 6 receives during this testing session. Since there are no previous GUI images on the test computer system 6, the entirety of the GUI 4 output is sent as a single image to the test computer 6. In principle, this whole GUI 4 output may be sent as several images that when combined, covered the whole GUI 4 output at this time.

Figure 6:
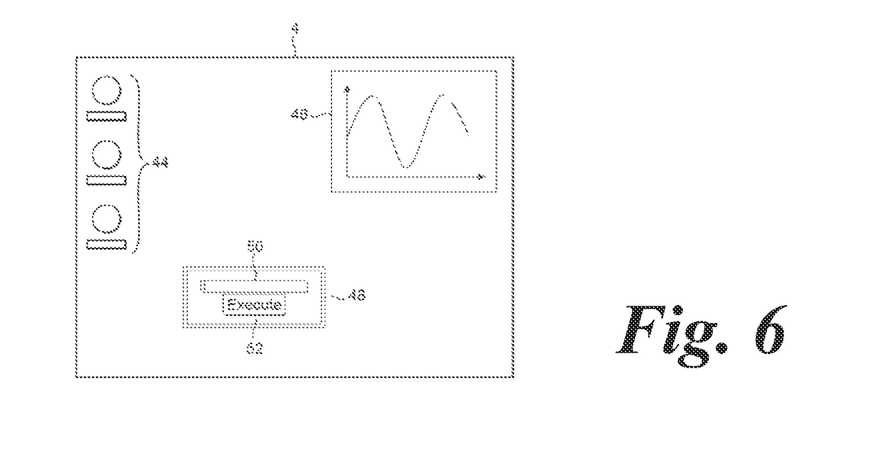
FIG. 6 shows a further example of a GUI for a system under test.

FIG. 6 shows the GUI 4 output from the same SUT 2 at a later point in time $t_1$. This is when the test computer 6 has sent an instruction to the SUT 2 to execute an operation, for example, the operation detailed in step 104 below.

The result of the SUT 2 processing data according to the task has led to the GUI 4 to output, at time $t_2$ seconds, a different graph 46 in the top right corner and to introduce a new dialogue box 48 with a text insertion box 50 and an "Execute" button 52. The six image objects 44 on the left hand GUI 4 edge remain the same.

Figure 7:
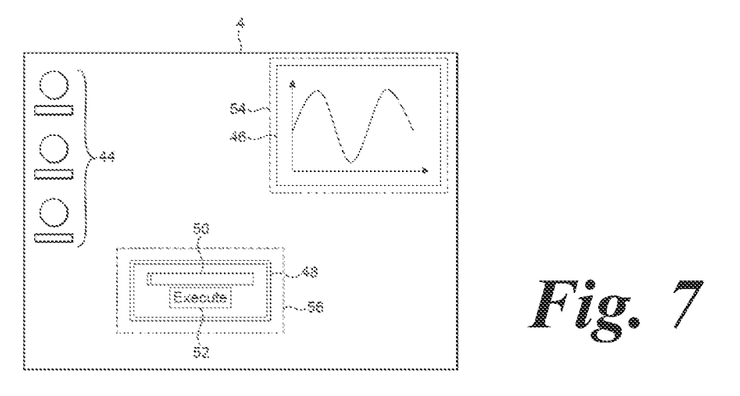
FIG. 7 shows a further example of a GUI for a system under test.

At the next cycle of GUI image updates being sent to the test computer 6, the SUT 2 sends two GUI images as shown in FIG. 7 to the test computer system at time $t_3$. The time difference between $t_2$ and $t_3$ is due to the time between the SUT 2 executing the instruction/operation and the GUI image being updated. The first GUI image 54 is a first set of pixels covering and including the new graph 46. The second GUI image 56 is a second set of pixels including at least all of the pixels on the GUI 4 that show the new dialogue box 48.

Figure 8:
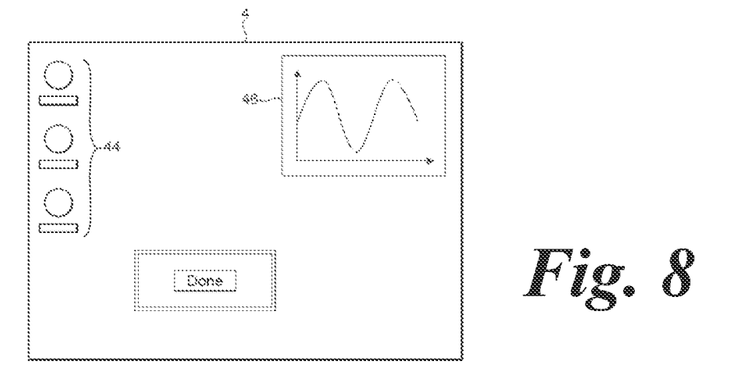
FIG. 8 shows a further example of a GUI for a system under test.

FIG. 8 shows the output from the same GUI 4 of FIGS. 4, 6 and 7 at a later point in time $t_4$. At time $t_4$, the test computer 6 has sent another command (i.e. another execution operation such as described in step 104 below) to the SUT 2 to "click" the execute button 52. The resulting processing by the SUT 2 has led to the GUI 4 to remove the text insertion box 50 and "Execute" button 52 from the dialogue box 48 and replace it with rectangular box with the word "Done." This is done at a time $t_5$, where the time difference between $t_4$ and $t_5$ is the time taken for the SUT 2 to execute the instruction and update the GUI 4.

Figure 9:
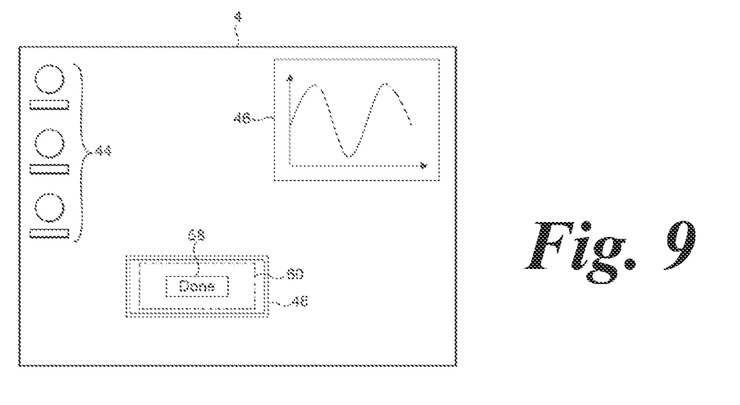
FIG. 9 shows a further example of a GUI for a system under test.

FIG. 9 shows the GUI 4 output of FIG. 8 together with the selected GUI image to be sent to the test computer 6 at time $t_6$. Again, the difference between $t_5$ and $t_6$ is due to the time between the SUT 2 updating the GUI and the updated GUI image being sent to the test computer.

The GUI images provided in the image updates according to the example above and any of the methods/systems described herein, may in principle be one or more images. The images may be rectangular or take any other shape and be in any image format such as '.bmp,' '.jpeg', '.png' file format.

The images may be based on a grid system wherein the GUI 4 output is notionally divided into sections for GUI image output. When a pixel has changed in that section then the whole section is output as a GUI image.

The GUI updates sent to the test computer 6 therefore provide a time sliced update of what pixels in the GUI 4 output have changed at a particular point in time.

The GUI images received from the SUT 2 may be stored by one or more memory elements 32. The memory elements 32 may be housed within and/or are part of the test computer system 6. Additionally or alternatively one or more memory elements may be housed remotely from, but in communication with, the test computer system 6. The method proceeds to step 104.

Step 104: Execute Operation

At step 104, an optional step of the test description 24 is executed. The step is defined in the lines of code forming the test description 24 and defines a particular operation to be carried out on the GUI of the SUT 2. In non-limiting examples, this may comprise selecting a particular icon or menu button on the GUI of the SUT 2 through implementation of a "selection" instruction corresponding to, for example, a mouse click or a touchscreen selection of the particular icon.

However, this is merely exemplary and the operation may comprise any other suitable action or control of the GUI of the SUT 2 as required by the test description 24.

Indeed, this step may be omitted and step 106 below may simply wait for a particular change to occur without a prior operation having been previously carried out. The method proceeds to step 106.

Step 106: Define Monitored Section of GUI for Changes

At step 106, a pre-defined section of the GUI of the SUT 2 is monitored for changes. This may be done continuously whilst the program is running, or may be carried out responsive to the initiation of step 104, i.e. the monitoring may be started when the operation instruction is sent to the SUT 2.

This is, in an embodiment, performed by analysing the GUI images received continuously or on demand as detailed in step 102. In an embodiment, the analysis is performed by the test computer 6.

The entire GUI of the SUT 2 may be monitored for changes. Alternatively, only a part thereof may be monitored. The particular section of the GUI which is monitored may be pre-selected or may be selected in dependence upon the operation instruction carried out in step 104 if step 104 is carried out. In non-limiting embodiments, the section of the GUI to be monitored may be 50% or less of the total area of the GUI. This may be the case if, for example, a large window or other area was to be monitored, or if an icon may appear anywhere within a relatively large area of the screen.

In other non-limiting embodiments, the section of the GUI to be monitored may be smaller. For example, the section may be 10% or less of the total area of the GUI. This may be the case for a smaller window or specific region to be monitored. A data or other field may be 5% or less.

In non-limiting embodiments, the size of the section to be monitored may be smaller still. For example, if a particular icon is to be selected in step 104, then the test computer system may monitor only the section of the GUI corresponding to the selected icon. This may be, for example, 1% or less of the total area of the GUI.

Alternatively, the pre-defined section of the GUI may be identified based on specifics of the process to be tested without requiring dependence upon a previous instruction. For example, a test process may be operable to detect the arrival of an email in a viewing pane. Since the email arrival is not the explicit result of a command instruction (at least not directly), then the viewing pane window (which has a known geometry) can simply be monitored to detect a change in the window resulting from a new email arrival.

Alternatively or additionally, a section to be monitored may be identified based on pre-determined coordinates, or may be identified based on a relative location with respect to existing GUI elements. For example, if a change in a dialogue box is required to be identified, then it may be known that the dialogue box will appear in a particular portion of the screen, or within a predetermined number of pixels above/below or left/right of an icon, UI element or other aspect of the GUI.

In addition, the selection of only a part of the GUI to be monitored reduces the computational overhead of the monitoring step. Further, monitoring only a relevant portion of the GUI prevents erroneous detection of changes: for example, if a clock or other unrelated active program (e.g. a desktop or screen "widget") changes during the monitored period then this will not be erroneously detected.

Alternatively, if, for example, the selection instruction in step 104 is to execute a video, then step 106 is operable to identify the change within the video window. The change is indicative that the instruction in step 104 has resulting in a change to the section of the GUI being monitored.

The change to be searched for may be a change responsive to the execution of step 104. In other words, the operation carried out on the GUI in step 104, if executed correctly on the SUT 2, will result in a change in the GUI of the SUT 2. In the case of an execution operation such as selecting ("clicking on") an icon, the icon may change in appearance or may cause the appearance of other GUI elements such as a menu, dialog box, window or simply a change in colour of the icon itself.

Alternatively, the change to be searched for may not directly result from a specific instruction. For example, the example of the detection of an email arriving in a viewer window is appropriate here.

A test description may be configured to perform a particular test on a test computer system that results, possibly indirectly, in the sending of an email. It is desired to determine a test pass or fail on whether the email arrives and is displayed successfully.

When the email arrives, it will be presented (for example) at the top of the window displace other emails at (for example) from the top of the window. This change can then be detected within the pre-defined area of the viewing window of the GUI as confirmation of the successful completion of the test process.

It is noted that this type of detection is impossible to do with conventional testing processes. Conventionally, the GUI update would be matched to a reference image to determine a test pass or fail. However, if the content, title or header of an email is not known before the email arrives, then the appearance of the email on the GUI will not be known in advance. Therefore, an image matching process will fail in this instance because there is no prior reference image available for image matching. However, the present disclosure enables this process to be carried out accurately and for any type of unknown change which may occur as part of an automated test, either as the direct result of an operation instruction or resulting indirectly therefrom.

The step of monitoring may be implemented in any suitable way. For example, the GUI images and/or image updates detailed in step 102 may be analysed to detect changes in the GUI. This may be done by any suitable method, For example, image analysis may be performed on each GUI update to determine any changes to the GUI. Additionally or alternatively, in the case where only pixels of the GUI which have changed are updated in step 102, the changed pixels could be analysed to determine whether these changes lie within the section of interest. Additionally or alternatively, time-sliced GUI images may be reviewed and image analysis carried out to determine changes therebetween.

Additionally or alternatively, the GUI may be monitored non-graphically. Instead, the GUI could be monitored on a code base level to identify graphical program elements (for example, active "widgets" or icons) which have changed within a predetermined time period and/or responsive to the operation being carried out in step 104.

The monitoring process may be carried out continuously during the automated test. Alternatively, the monitoring may only be carried out when required for the execution of operation such as step 104.

In the context of the present disclosure, a relevant change is a change in the appearance and/or software-level configuration of the GUI. In other words, a relevant change corresponds to a change in the appearance and/or configuration of the GUI relative to the appearance and/or configuration of the GUI at a previous time. The change may be, optionally, be detected as a change between the GUI prior to the execution of the operation in step 104 and after the execution of the step 104.

An example will be illustrated with reference to FIGS. 4 and 6 to 9 as discussed in step 102 above. As set out above, FIG. 6 shows the GUI 4 output from the same SUT 2 at a later point in time $t_1$ when step 104 is executed by the SUT 2 to execute an operation.

The result of the SUT 2 processing data according to the task has led to the GUI 4 to output, at time $t_2$ seconds, the new graph 46 and a new dialogue box 48 with a text insertion box 50 and an "Execute" button 52. The test program may be, for example, configured to monitor the section in which the execute button is known to appear.

At the next cycle of GUI image updates being sent to the test computer 6 at time $t_3$, the SUT 2 sends two GUI images shown in FIG. 7.

At step 106, the monitoring step will monitor for the changes as set out in this example. The monitoring step monitors for changes which have occurred since time $t_1$ in the monitored section of the "execute box." Therefore, the method will detect the change in this section when the updated GUI image is received at the test computer at time $t_3$.

Once the changes have been detected, the method can then proceed to later verification and/or instruction steps.

A similar example is illustrated with reference to FIGS. 8 and 9 described above.

FIG. 8 shows the output from the GUI 4 at a point in time $t_4$. At time $t_4$, the test computer 6 sends another command (i.e. another execution operation such as described in step 104 above) to the SUT 2 to "click" the execute button 52. The resulting processing by the SUT 2 has led to the GUI 4 to remove the text insertion box 50 and "Execute" button 52 from the dialogue box 48 and replace it with rectangular box with the word "Done." This is done at a time $t_5$, where the time difference between $t_4$ and $t_5$ is the time taken for the SUT 2 to execute the instruction and update the GUI 4. The method may be configured to identify changes occurring within the section in which the "Done" box is due to appear. This may be around 5-10% of the total area of the GUI. The location of the section to be monitored may be pre-determined from coordinates or from a location relative to an existing GUI element—for example, relative to the location of the "Execute" box.

FIG. 9 shows the GUI 4 output of FIG. 8 together with the selected GUI image to be sent to the test computer 6 at time $t_6$. Again, the difference between $t_5$ and $t_6$ is due to the time between the SUT 2 updating the GUI and the updated GUI image being sent to the test computer.

Again, at step 106, the monitoring step will monitor for the changes as set out in this example. The monitoring step monitors for changes which have occurred since time $t_4$. The method proceeds to step 108.

Step 108: Change Detected?

At step 108, it is determined whether a change has been detected in the GUI or the selected monitored section of the GUI within a predetermined time period resulting from the operation carried out in step 104.

The method is operable to wait for a predetermined time period for the change to occur before returning an error. In embodiments, the predetermined time period may be of the order of multiple seconds or longer—essentially a "time out" if, for example, the system has crashed. This may be the case if, for example, the instruction in step 104 is operable to start a video. If no change is detected within the video window (which may be the selected area of the GUI to be monitored) within a predetermined time period, then it may be determined that the instruction has failed.

In non-limiting embodiments, the time period may be set to a long period (e.g. minutes) if a particular change is to be detected. For example, in the case of the detection of the arrival of an email (which may take an indeterminate amount of time, depending upon hardware and network capabilities) it may be necessary to wait a long period before a change is detected. For example, in non-limiting embodiments, a five minute time period may be set.

Alternatively, shorter periods of a minute or less, or thirty seconds or less, may be specified. Even shorter periods may be used in non-limiting embodiments, depending upon the application. For example, less than 10 seconds, less than 2 seconds or one second or less may be appropriate timescales for detection of particular changes in the GUI.

However, other (or additional) optional time periods may be specified. These time periods may be determined empirically or automatically based on measured or estimated capabilities of the SUT 2 and test computer system 6. These optional time periods may be set to provide an indication that the SUT 2 has errors but has not suffered a total failure.

If a change is detected within the one or more predetermined time periods, the method proceeds to step 110. If a change is not detected within the predetermined time period, then the method proceeds to step 114.

Step 110: Wait

Step 110 is optional and may be implemented if desired. Upon detection of a relevant change in the appearance and/or software configuration of the GUI of the SUT 2 resulting from the operation in step 104, a time delay may be executed.

The time delay is not essential. However, a small time delay (of the order of 0.1-0.3 s—may be useful to ensure that, for example, the GUI has updated properly following the change that has been detected. The method proceeds to step 112.

Step 112: Continue/Finish

At step 112, a change has been detected and so it is determined that the test has been completed correctly. Any further steps of the test description 24 may be carried out as required, which may involve further verifications and/or instructions. Alternatively, the method may finish with a report of a test pass.

Step 114: Test Fail

If a change is not detected in step 108, then the test has failed and this is reported to the test programmer for further consideration.

Figure 10:
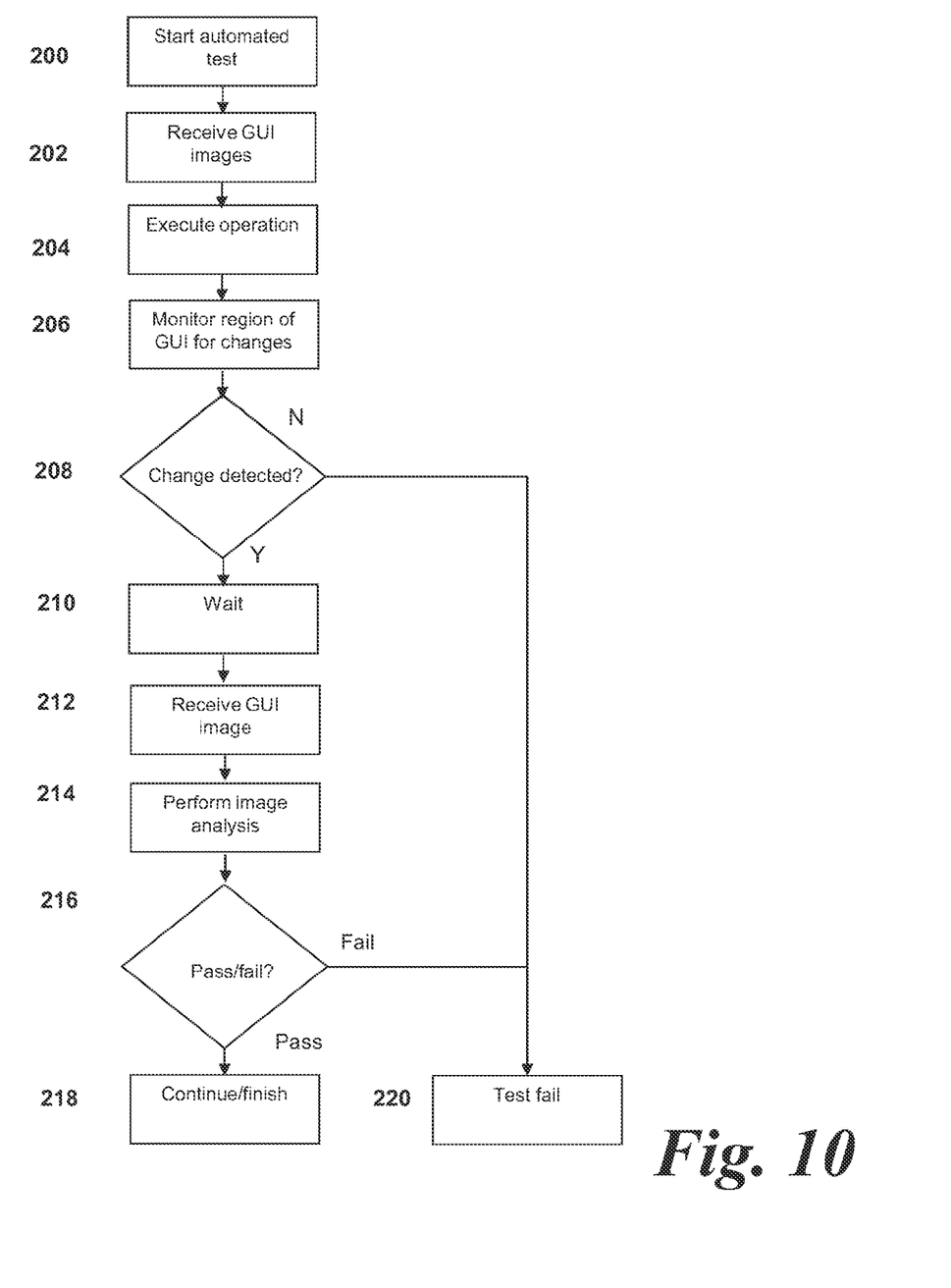
FIG. 10 shows a flow chart in accordance with another embodiment of the present disclosure.

A second embodiment of a method according to the present disclosure will now be described with reference to FIG. 10. FIG. 10 shows a flow chart of a method according to the second embodiment. In the second embodiment, the detection of a change in the GUI is utilised to improve the reliability of image capture for analysis.

The second embodiment of the present disclosure relates to a different method for utilising detected changes in a GUI.

When carrying out specific steps of the test description, time must be allowed for each step. For example, consider a step of a test which comprises an operation such as the selection (via, for example, a mouse click) of an icon on the GUI. The test program will then look for an expected image in the GUI resulting from that operation. In general, when creating a test description, a pre-determined amount of time will be allowed for between the execution of a particular step and the receipt of an image from the GUI of the SUT prior to image comparison being performed.

In other words, the test programmer will allow sufficient time for the SUT to process an step instruction sent by the test computer, update the GUI to represent the execution of that instruction and send the updated GUI image to the test computer before the test computer performs the step of comparing the latest GUI image with the newly-selected reference image.

This time delay may be entered in the form of a "wait for" command. A "wait for" command is a command recognised by the test program that gives the effect of delaying the progress of execution of the next step of the test description by a predetermined amount of time. The predetermined amount of time may form an instruction line of the test description or may take the form of metadata accompanying or associated with the test description.

However, in practice, such a fixed pre-determined delay period may lead to operational errors. To explain, the delay period between the sending of an instruction by the test computer and the receipt of a reference image from the GUI of the SUT may result from numerous different factors. For example, the delay period may result from one or more of: the network connection between the test computer and the SUT; the hardware and/or software capabilities of the SUT; and the hardware and/or software capabilities of the test computer.

In practice, it may not be possible to determine which of these factors is responsible for any delay. For example, the response time (i.e. the "ping") of the communication network connecting the test computer and the SUT may vary between hugely a fast Local Area Network (LAN) and a remote test carried out across the internet.

There may also be significant variation depending upon the hardware/software configuration of the SUT. For example, a GUI running on a SUT having a relatively slow CPU or GPU or other computational hardware, or hardware which is computationally overloaded with software tasks (e.g. multitasking or background processes), may take considerably longer to execute an instruction and update a GUI than a lightly-loaded SUT or a SUT comprising a relatively fast CPU, GPU or other computational hardware.

This variation may mean that, even if the time delays entered into the test description during "test description creation mode" are based on real-world delays, there may be situations where the delay period is accurate but errors occur in the test result.

Consider an example where a relatively slow SUT is connected to the test computer over a relatively fast network. Firstly, a step of the test description is carried out executing a particular operation on the GUI of the SUT. In this example, an icon is selected. At a predetermined period later, a GUI image is obtained from the GUI of the SUT. However, due to the slow processing speed of the SUT, the GUI image is obtained before the GUI has been updated to reflect the selection of the icon.

Therefore, when the test computer attempts to find the reference (or "expected") image in the captured GUI image, the test will fail because the GUI has not yet been updated to show the expected image resulting from the execution of the operation. Therefore, whilst the SUT may have successfully completed the test, the GUI image captured for image analysis would indicate a test failure. Therefore, an erroneous test failure would be returned. The second embodiment addresses this type of error.

Steps 200-210 and 218-220 of the second embodiment correspond directly to steps 100-110 and 112-114 respectively of the first embodiment. Therefore, these steps will not be discussed further here.

Step 212: Select GUI Image

Once the change has been detected at step 208, and any necessary time delay introduced in step 210, at step 212, image analysis is then carried out. At a given line in the description 24, the test computer will select the latest GUI image stored by the memory element 32 prior to performing image analysis on the GUI image to find a particular reference or "expected" image.

By waiting for an appropriate change in the GUI in step 108, the method of the present disclosure ensures that the GUI image that is received corresponds to the GUI after a change resulting from the execution of the operation in step 204. Therefore, errors resulting from the obtaining of a GUI image prior to the GUI being updated to reflect the completion of the operation in step 204 are reduced.

Turning to the examples of FIGS. 6 to 9, the present disclosure is in contrast with known methods which may introduce a delay to enable the SUT 2 to respond, but carry the risk that a GUI image may be captured between times $t_2$ and $t_3$ in this example, i.e. when the GUI 4 of the SUT has changed in response to the instruction at time $t_1$, but before the GUI image has been sent to the test computer. The method proceeds to step 214.

Step 214: Perform Image Analysis

Once the GUI image has been obtained in step 212, image analysis is performed to identify an "expected image" or reference image in the captured GUI image to determine whether the operation of step 204 has been executed correctly.

The "expected image" may be the whole GUI image or, alternatively, one or more parts of the GUI image, for example, an icon. The GUI image that the test computer 6 compares to find the expected image may, in some situations, only include the one or more sub section/s of the GUI 4 output most recently sent by the latest GUI image update from the SUT 2 and occurring after the change detected in step 108 has occurred. Alternatively, the GUI image that is compared may be a composite image based upon all the GUI images sent by the SUT 2 after the change has occurred to represent the current whole GUI 4 output after the execution of the operation in step 204.

The expected image may be an image that indicates a particular action has been accomplished by the SUT 2, for example, the expected image may be part of a dialogue box generated in response to the operation of step 204. The expected image may be an image that represents an interactive feature on the GUI of the SUT that the test program wishes to utilise. For example a round button 44 as shown in FIG. 6, which when selected and activated on the SUT GUI 4 will cause a pop-up menu to appear that the test program can then further utilise in the testing of the SUT 2. The expected image may be the whole GUI image or one or more parts of the GUI image.

When performing the image analysis to identify the expected image, the test program uses existing reference images that are associated with the expected graphical make-up of the expected image. Typically these reference images will be similar or identical to the expected image such that the test program can search the GUI image for a graphic similar to or identical with the reference image. For example, they may be identical to the expected image save for, for example, a scaling or other dimensional transform, or a colour transform.

In embodiments, the test program may utilise various methods of performing this image analysis and may try to 'match' the reference image to at least a portion of the GUI image/s using any suitable image analysis technique. This may include, for example, having to re-size or rotate the reference image to find a match. The skilled person would be readily aware of techniques which could be used to determine whether an expected image has been found.

Expected images contained within the GUI image may be associated with "events" that are activate-able within the SUT 2 as discussed above. For example these reference images may comprise icons or start buttons. These "events" may be utilised by the test program. Each event is executable in the SUT 2 by the selection of a particular one or more activating pixels or "hotspots." The hotspots may be within the expected image or outside of the expected image. The method then proceeds to step 216.

Step 216: Determine Step Test Pass/Fail

Based on the image analysis carried out in step 214, it is then determined whether the expected image is found in the GUI image obtained in step 212.

If the expected image is found, the method proceeds to step 218. If the expected image is not found, the method proceeds to step 220.

Figure 11:
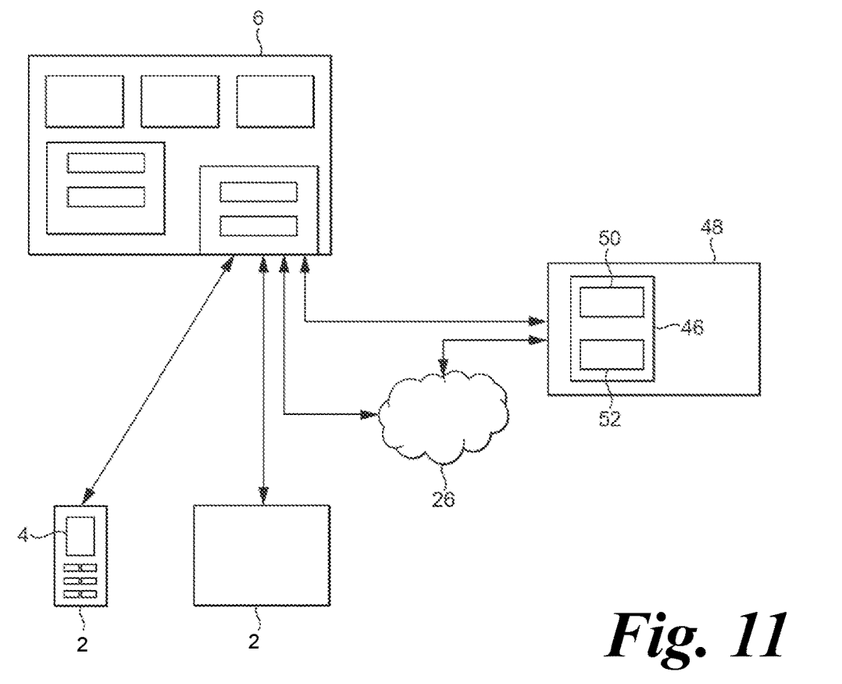
FIG. 11 shows an example of a test computer system in communication with several systems under test and a remote server comprising a database.

FIG. 11 shows an example of a system using the method as described herein where reference images are stored upon an external memory/storage device that is remote from the test computer system.

The external device may be a central server or other computer system with access to one or more communication devices such that one or multiple test computer systems 6 can send or retrieve reference images to/from the server.

The server may operate one or more databases or other information handling systems on one or more memory devices. The databases may store multiple different reference images. One database 50, or a part of one or more databases, may be available to all test computer systems 6 or a set of one or more test computer systems and store reference images generated from those test computer systems 6. The test systems 6 with access to that database 50 may therefore be able to access the reference images created by other test computer systems 6. This may be beneficial, for example, where different companies that make software applications 20 (and test them using a test system as described) need to update reference images because of a new change in a common operating system 16 that their application programs 20 run upon. If a first user creates reference images according to any of the methods described herein and stores them on the database 50, then other users can subsequently use the same reference images by retrieving them from the same accessible database 50, therefore saving processing time.

The server 48 may comprise hardware elements similar to those described for the test computer system 6.

The server may also comprise restricted database records 52 that only one or a select subset of test computers 6 or users can access. This may be useful, for example, where a particular company is testing a new version of its own software 20 and does not want others outside its organisation to see its new images prior to release of the software 20.

Embodiments of the present disclosure have been described with particular reference to the examples illustrated. However, it will be appreciated that variations and modifications may be made to the examples described within the scope of the present disclosure.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realised by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

The above discussion is meant to be illustrative of certain principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for performing an automated computer test, the automated test being configured, when executed, to cause a test computer system to control a graphical user interface of a system under test comprising one or more computer programs being executed upon a computer device, wherein the automated computer test comprises one or more verification steps configured to test whether one or more operations have been successfully completed by the system under test, the verification step comprising:

a) monitoring at least a part of the graphical user interface of the system under test to detect a change in the graphical user interface within a predetermined time period; and
   b) determining that one or more operations have been completed successfully if a change in the graphical user interface is detected within the predetermined time period, wherein the method further comprises the step of:
   c) performing further operations and/or verification steps on the system under test if required.

2. The method according to claim 1, wherein step a) further comprises:
   defining one or more sections of the graphical user interface; and
   monitoring only the or each predefined section for changes.

3. The method according to claim 2, wherein the predefined section is selected to correspond to a window, icon or other known element on the graphical user interface.

4. The method according to claim 2, wherein the predefined section is rectangular.

5. The method according to claim 2, wherein the location and/or size of the predefined section is defined relative to a known graphical user interface element.

6. A method according to claim 2, wherein the predefined section has an area which is 50% or less of the total area of the graphical user interface of the system under test.

7. The method according to claim 2, wherein the predefined section has an area which is 10% or less of the total area of the graphical user interface of the system under test.

8. The method according to claim 2, wherein the predefined section has an area which is 1% or less of the total area of the graphical user interface of the system under test.

9. The method according to claim 1, wherein the predetermined time period is 5 minutes or less.

10. The method according to claim 9, wherein the predetermined time period is 1 minute or less.

11. The method according to claim 10, wherein the predetermined time period is 1 second or less.

12. The method according to claim 1, wherein a change in the graphical user interface comprises a change in the graphical and/or software configuration of the graphical user interface.

13. The method according to claim 1, wherein said one or more operations may comprise one or more operations performed on the system under test or on a further system under test in communication with the system under test.

14. The method according to claim 1, wherein, if a change in the graphical user interface is not detected within the predetermined time period, the method comprises the steps of:
   determining that the verification step has failed.

15. The method according to claim 1, wherein, prior to step a), the automated test further comprises the step of:
   executing an operation on the graphical user interface of the system under test, wherein the change detected in step b) is a change resulting from the execution of the operation.

16. The method according to claim 15, wherein the predetermined time period is determined from the time the operation was executed on the graphical user interface.

17. The method according to claim 1, wherein said one or more operations comprise one or more of the following commands: a selection of an object, image, icon, button and/or other user interface item on the graphical user interface; the selection of a dialog box; the selection of a menu item; the opening of window; the selection of an executable object; a request or instruction to start a program or application; a text-based instruction; and/or an instruction to a further system under test to communicate with the system under test.

18. The method according to claim 1, wherein the automated computer test comprises a test description configured to be executed by a test program to cause the test computer system to perform the automated computer test.

19. The method according to claim 18, wherein the test description comprises the one or more verification steps and/or one or more steps configured to execute the one or more operations.

20. A method for performing an automated computer test, the automated test being configured, when executed, to cause a test computer system to control a graphical user interface of a system under test comprising one or more computer programs being executed upon a computer device, wherein the method comprises the steps of:
   a) executing an operation on the graphical user interface of the system under test;
   b) monitoring at least a part of the graphical user interface to detect a change in the graphical user interface resulting from the operation on the graphical user interface, wherein, if a change is detected, the method further comprises the steps of:
   c) receiving an image of the graphical user interface of the remote system under test; and
   c) comparing the received image from the system under test with one or more existing reference images to identify an expected image.

21. The method according to claim 20, wherein, in step b), a change in the graphical user interface comprises a change in the graphical and/or software configuration of the graphical user interface.

22. The method according to claim 20, wherein the operation on the graphical user interface of the system under test comprises one or more of: a selection of an object, image, icon, button and/or other user interface item on the graphical user interface; the selection of a dialog box; the selection of a menu item; the opening of window; the selection of an executable object; a request or instruction to start a program or application; a text-based instruction; and/or an instruction to a further system under test to communicate with the system under test.

23. The method according to claim 20, wherein, in step b), if a change is detected, the method further comprises, prior to step c):
   waiting for a predetermined time period.

24. The method according to claim 20, wherein the automated computer test comprises a test description configured to be executed by a test program to cause the test computer system to perform the automated computer test.

25. The method according to claim 24, wherein the test description comprises an executable instruction to carry out step a).

26. A non-transitory computer readable medium containing instructions that, when executed by a processor, cause the processor to perform a method for performing an automated computer test, the automated test being configured, when executed, to cause a test computer system to control a graphical user interface of a system under test comprising one or more computer programs being executed upon a computer device, wherein the automated computer test comprises one or more verification steps configured to test whether one or more operations have been successfully completed by the system under test, the or each verification step comprising:
   a) monitoring at least a part of the graphical user interface of the system under test to detect a change in the graphical user interface within a predetermined time period; and
   b) determining that one or more operations have been completed successfully if a change in the graphical user interface is detected within the predetermined time period, wherein the method further comprises the step of:
   c) performing further operations and/or verification steps on the system under test if required.

27. A computer system comprising:
   a processing device;
   a storage device; and
   a non-transitory computer readable medium containing instructions that, when executed by the processing device, cause the processing device to perform a method for performing an automated computer test, the automated test being configured, when executed, to cause a test computer system to control a graphical user interface of a system under test comprising one or more computer programs being executed upon a computer device, wherein the automated computer test comprises one or more verification steps configured to test whether one or more operations have been successfully completed by the system under test, the or each verification step comprising:
   monitoring at least a part of the graphical user interface of the system under test to detect a change in the graphical user interface within a predetermined time period; and
   determining that one or more operations have been completed successfully if a change in the graphical user interface is detected within the predetermined time period, wherein the method further comprises the step of:
   performing further operations and/or verification steps on the system under test if required.

* * * * *